US011895216B2

(12) United States Patent
Lin et al.

(10) Patent No.: US 11,895,216 B2
(45) Date of Patent: Feb. 6, 2024

(54) APPLICATION DATA UNITS

(71) Applicant: QUALCOMM Incorporated, San Diego, CA (US)

(72) Inventors: Yih-Hao Lin, San Diego, CA (US); Prashanth Haridas Hande, San Diego, CA (US); Mickael Mondet, Louannec (FR); Peerapol Tinnakornsrisuphap, San Diego, CA (US); Dario Serafino Tonesi, San Diego, CA (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/656,565

(22) Filed: Mar. 25, 2022

(65) Prior Publication Data

US 2023/0308529 A1 Sep. 28, 2023

(51) Int. Cl.
*H04L 69/22* (2022.01)
*H04L 1/00* (2006.01)

(52) U.S. Cl.
CPC ............ *H04L 69/22* (2013.01); *H04L 1/0041* (2013.01); *H04L 1/0056* (2013.01)

(58) Field of Classification Search
CPC ...... H04L 69/22; H04L 1/0041; H04L 1/0056
See application file for complete search history.

(56) References Cited

U.S. PATENT DOCUMENTS

| 10,382,598 B1* | 8/2019 | Zhang | H04W 28/04 |
| 2003/0233464 A1* | 12/2003 | Walpole | H04N 21/234327 |
| | | | 709/231 |
| 2004/0203979 A1* | 10/2004 | Attar | H04B 7/0615 |
| | | | 455/127.1 |
| 2012/0147936 A1* | 6/2012 | Rangan | H04L 1/188 |
| | | | 709/217 |
| 2014/0329550 A1* | 11/2014 | Diachina | H04W 68/02 |
| | | | 455/458 |
| 2016/0088127 A1* | 3/2016 | Cai | H04W 28/0205 |
| | | | 370/328 |
| 2018/0018713 A1* | 1/2018 | Burleigh | G06F 16/2453 |
| 2018/0039543 A1* | 2/2018 | Luby | G06F 3/067 |
| 2018/0359802 A1* | 12/2018 | Cho | H04W 72/56 |
| 2020/0351905 A1* | 11/2020 | Venugopal | H04L 5/0094 |
| 2020/0389813 A1* | 12/2020 | Hande | H04W 28/0236 |
| 2021/0051189 A1* | 2/2021 | Ljung | G06T 19/006 |

(Continued)

FOREIGN PATENT DOCUMENTS

WO 2019164873 A1 8/2019

OTHER PUBLICATIONS

International Search Report and Written Opinion—PCT/US2023/061268—ISA/EPO—dated May 4, 2023.

*Primary Examiner* — Oleg Survillo
*Assistant Examiner* — Monishwar Mohan
(74) *Attorney, Agent, or Firm* — Harrity & Harrity, LLP

(57) ABSTRACT

Various aspects of the present disclosure generally relate to wireless communication. In some aspects, a network node may receive application data for transmission via an additional network node. The network node may provide the application data to the additional network node, the application data having one or more indications of groupings into application data units (ADUs) added before being provided to the additional network node. Numerous other aspects are described.

30 Claims, 8 Drawing Sheets

(56) References Cited

U.S. PATENT DOCUMENTS

2021/0203565 A1\* 7/2021 Arora ..................... G06N 5/04
2022/0141703 A1\* 5/2022 Dhammawat ......... H04W 76/12
370/328

\* cited by examiner

APPLICATION DATA UNITS

FIELD OF THE DISCLOSURE

Aspects of the present disclosure generally relate to wireless communication and to techniques and apparatuses for grouping application data into application data units.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving application data for transmission via an additional network node. The method may include providing the application data to the additional network node, the application data having one or more indications of groupings into application data units (ADUs) added before being provided to the additional network node.

Some aspects described herein relate to a network node for wireless communication. The network node may include a memory and one or more processors coupled to the memory. The one or more processors may be configured to receive application data for transmission via an additional network node. The one or more processors may be configured to provide the application data to the additional network node, the application data having one or more indications of groupings into ADUs added before being provided to the additional network node.

Some aspects described herein relate to a non-transitory computer-readable medium that stores a set of instructions for wireless communication by a network node. The set of instructions, when executed by one or more processors of the network node, may cause the network node to receive application data for transmission via an additional network node. The set of instructions, when executed by one or more processors of the network node, may cause the network node to provide the application data to the additional network node, the application data having one or more indications of groupings into ADUs added before being provided to the additional network node.

Some aspects described herein relate to an apparatus for wireless communication. The apparatus may include means for receiving application data for transmission via an additional network node. The apparatus may include means for providing the application data to the additional network node, the application data having one or more indications of groupings into ADUs added before being provided to the additional network node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
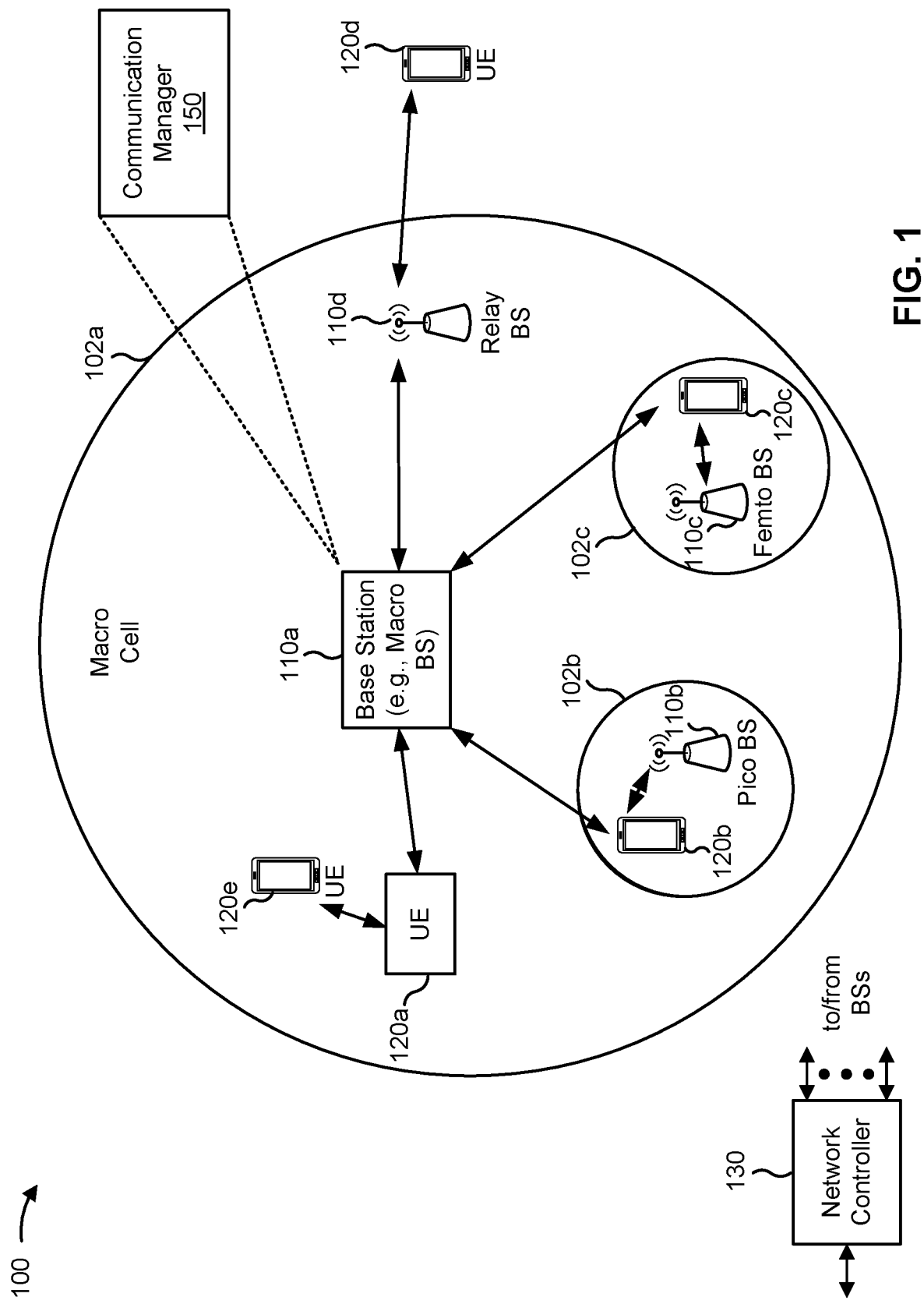
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a RAN network node may include a communication manager 150. As described in more detail elsewhere herein, the communication manager 150 may receive application data from a network node (e.g., a user plane function (UPF) and/or a service layer entity, among other examples) for transmission to a UE. The RAN network node may transmit the application data based at least in part on groupings of data packets (e.g., internet protocol (IP) packets) into ADUs as indicated by the network node. Additionally, or alternatively, the communication manager 150 may perform one or more other operations described herein.

As indicated above, FIG. 1 is provided as an example. Other examples may differ from what is described with regard to FIG. 1.

Figure 2:
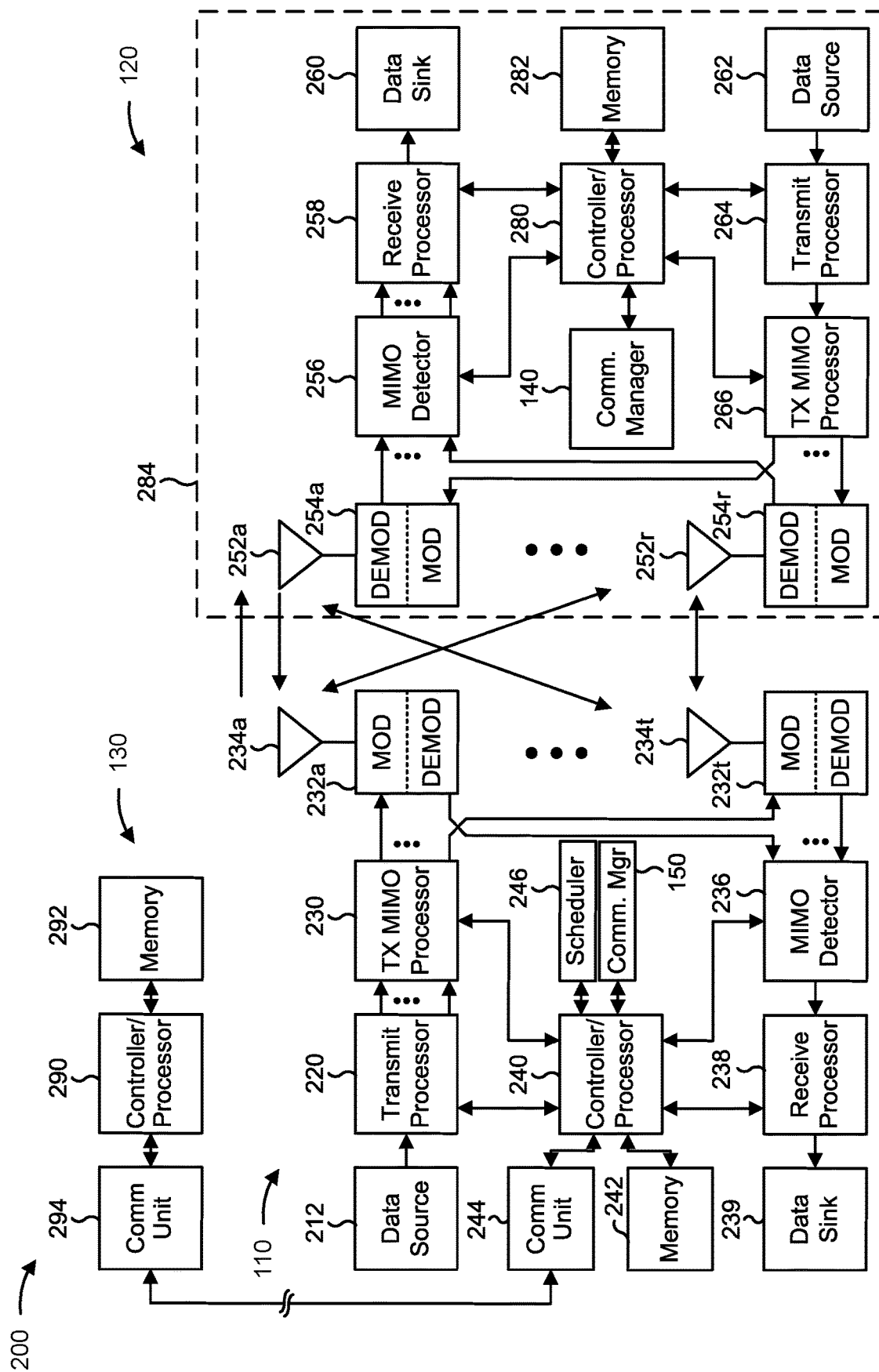
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with grouping application data into application data units, as described in more detail elsewhere herein. In some aspects, the RAN network node described herein is the base station 110, is included in the base station 110, or includes one or more components of the base station 110 shown in FIG. 2. In some examples, the controller/processor 240 of the base station 110, the controller/processor 280 of the UE 120, and/or any other component(s) of FIG. 2 may perform, direct, or support operations of, for example, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform, direct, or support operations of, for example, process 700 of FIG. 7, and/or other processes as described herein. In some examples, executing instructions may include running the instructions, converting the instructions, compiling the instructions, and/or interpreting the instructions, among other examples.

In some aspects, the network node includes means for receiving application data for transmission via an additional network node; and/or means for providing the application data to the additional network node, the application data having one or more indications of groupings into ADUs added before being provided to the additional network node. In some aspects, the means for the network node to perform operations described herein may include, for example, one or more of processor 820, memory 830, input component 840, output component 850, and/or communication component 860, depicted in FIG. 8.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
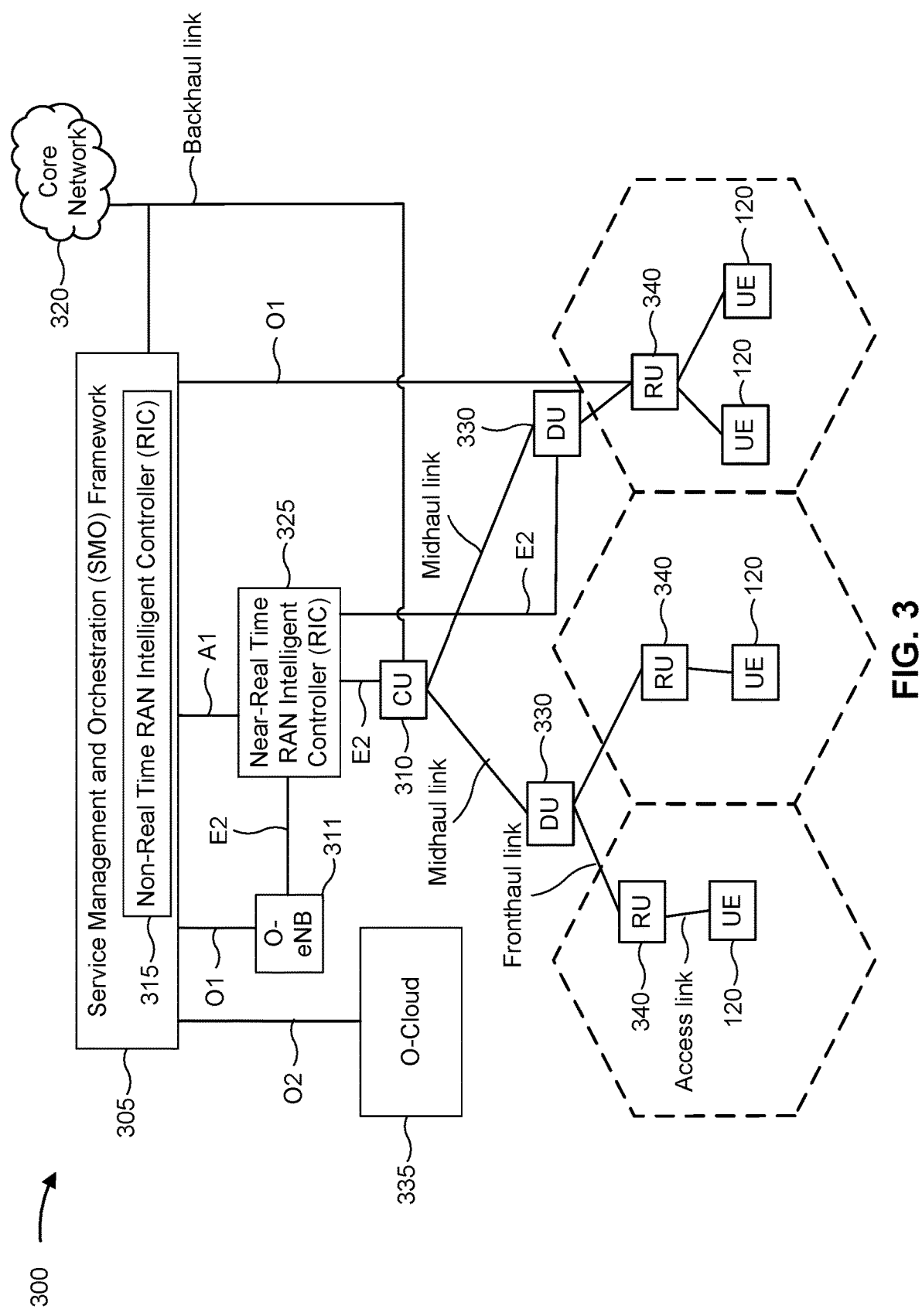
FIG. 3 is a diagram illustrating an example disaggregated base station architecture, in accordance with the present disclosure.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
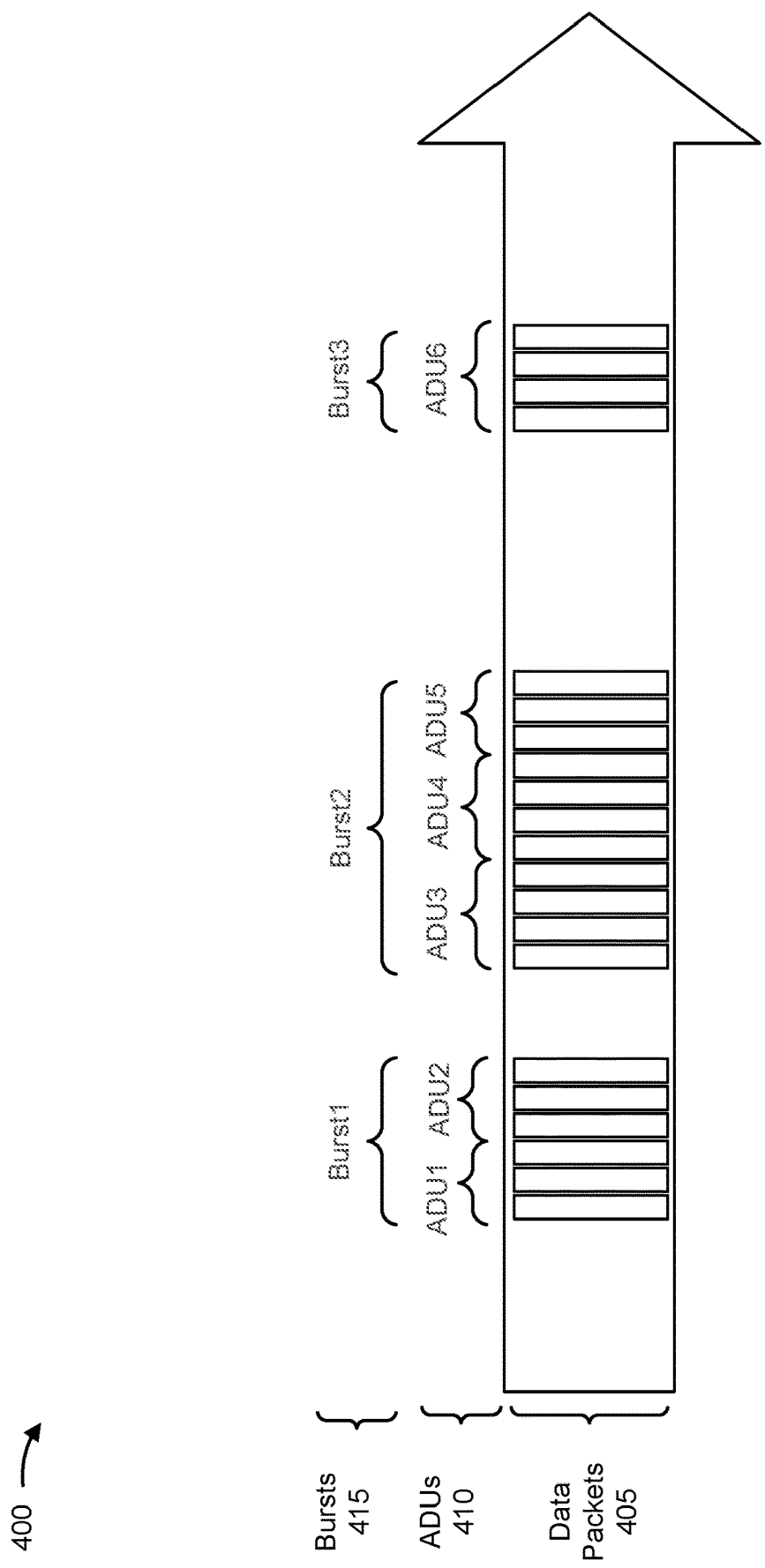
FIG. 4 is a diagram illustrating an example of application data units, in accordance with the present disclosure.

FIG. 4 is a diagram illustrating an example 400 of ADUs, in accordance with the present disclosure. FIG. 4 shows a structure of one or more communications that include application data that is grouped into ADUs. A first device (e.g., a network node, a RAN network node, or an application server, among other examples) may provide the application data to a second device (e.g., a network node, a RAN network node, or a UE, among other examples).

As shown in FIG. 4, the one or more communications include multiple data packets 405 (e.g., IP data packets). The first device may transmit the data packets 405 using different network resources and/or different timing resources. The data packets 405 may be grouped into ADUs 410. For example, ADU1 may be associated with a first frame of a video stream (e.g., an extended reality video stream), and ADU2 may be associated with a second frame of the video stream, etc.

The first device may transmit one or more of the ADUs 410 within bursts 415. For example, burst1 may include ADU1 and ADU2; burst2 may include ADU3, ADU4, and ADU5; and burst 3 may include ADU6. A burst of ADUs may include ADUs that are generated within a threshold amount of time. For example, ADUs of burst 1 may be separated in time from ADUs of burst 2 by a threshold amount of time.

Based at least in part on grouping the data packets 405 into ADUs 410, application key performance indicators (KPIs) may be associated with ADUs 410 (e.g., rather than each data packet 405 individually). The KPIs may include an ADU error rate (AER), an ADU delay budget (ADB), ADU discard time (ADT), and/or an ADU content policy (ACP), among other examples. The AER may indicate an allowable number of ADUs received in error on average. The ADB may indicate a maximum amount of delay that is tolerable for an ADU. The ADT may indicate a maximum queue retention of an ADU. The ACP may indicate a minimum portion (e.g., fraction or percentage) of ADU bits that are to be delivered when an ADU is FEC-protected (e.g., to support recovery of the ADU). The KPIs may be associated with requirements that apply to ADUs that satisfy a ADU traffic flow template (A-TFT) for filtering traffic.

In an example, a quality of service (QoS) control may be applied to ADUs instead of equally across all of the data packets 405. In some examples, the data packets 405 that are grouped into an ADU 410 may be associated with a single video frame. In this way, a later-received data packet 405 of the ADU 410 may have a shorter packet delay budget than an earlier-received data packet 405 of the ADU 410 such that all of the data packets 405 of the ADU 410 arrive in time for joint processing and/or rendering at a receiving device (e.g., a UE).

In some networks, a network (e.g., a 5G network) that is unaware of the ADUs may consume computing, power, network, and/or communication resources based at least in part on an increased communication error rate that is based at least in part on failing to satisfy the KPIs associated with the ADUs. For example, offline translation of application ADU requirements (e.g., AER or ADB) into data-packet-based requirements (e.g., packet error rate (PER), or packet delay budget (PDB)) per data packet may not be feasible. A relaxed PER configuration (e.g. PER=AER) results in actual AER being higher than the PER. In these cases, there may be a loss of information during translation from ADU to data-packet-based requirements. Additionally, or alternatively, a network that is unaware of the ADUs may consume network resources to conservatively attempt to satisfy the KPIs associated with the ADUs. For example, a conservative translation may require a PER to be much smaller than an AER (e.g. PER=AER/N, where N is an average number of IP packets per ADU), resulting in very low capacity.

As indicated above, FIG. 4 is provided as an example. Other examples may differ from what is described with regard to FIG. 4.

In some aspects described herein, a network node (e.g., a UPF or a service layer entity) may receive application data for transmission via an additional network node (e.g., a RAN network node) and add indications of ADUs to the application data before providing the application data to the additional network node. Based at least in part on the network node adding the indications of the ADUs to the application data, the network may be aware of the ADUs (e.g., groupings of data packets of the application data into ADUs). In this way, the network (e.g., a RAN network node) may handle communications associated with the application data based at least in part on the ADUs (e.g., using KPIs or other additional indications associated with the ADUs), which may conserve computing, power, network, and/or communication resources that may have otherwise been consumed based at least in part on an increased communication error rate from failing to satisfy the KPIs associated with the ADUs. Additionally, or alternatively, the network may conserve network resources that may have otherwise been consumed to conservatively attempt to satisfy the KPIs associated with the ADUs. In some aspects, signaling ADU-based QoS to 5G and 5G reporting back ADU based QoS is helpful even without a scheduler taking advantage of awareness of the ADU. For example, a source of the application data (e.g., an application server) may use the reporting to manage subsequent communications via the network or outside of the network.

The network node (e.g., UPF) may include a service layer (e.g., an ADU service layer). In some aspects, for each ADU delivered by an application server (e.g., an application on the application server), information related to this ADU (e.g., ADU metadata) may be passed to the network and/or an associated UE (e.g., a receiving node). The service layer of the UPF identifies the ADUs and signals the information related to the ADUs (e.g., a tag indicating an ADU number) to the network with associated data packets. In some aspects, the application server may explicitly provide the information related to the ADUs and/or the network node may identify the information related to the ADUs from the application data. For example, the service layer entity may learn to identify ADUs and/or the information related to the ADUs based at least in part on one or more metrics of traffic of the application data. The service layer entity may train and/or use a machine learning (ML) model to identify the ADUs and/or the information related to the ADUs. In some aspects, the network node may decouple information associated with ADUs as received from the application server from information associated with the ADUs as provided to the RAN network node. For example, the network node may decouple (e.g., allow for difference between) an indication from the application server of the ADU groupings and the information related to the ADUs and an indication from the network node of the ADUs and the information related to the ADUs used inside of the network (e.g., a RAN network node).

The network node (e.g., the service layer entity) may receive an ADU and ADU metadata (e.g., the information related to the ADU) from the application server via a dedicated interface. The UPF may provide the ADU metadata to a RAN network node in a general packet radio system (GPRS) tunnelling protocol user plane (GTP-U) header. In some aspects, the dedicated interface between the UPF and the application server may be based at least in part on a new and/or custom protocol. The ADU metadata may be carried in a protocol header or may be piggybacked in a payload of the ADU. In some aspects, some ADU metadata (e.g. an identifier of the ADU) are provided per data packet, while some ADU metadata (e.g. ADU length, a number of data packets, or an application FEC parameter, among other examples) are provided per ADU or updated only when the value changes. The dedicated interface may be proprietary between the application server and the UPF in a domain of an operator of the network, or the dedicated interface may be standardized in a communication protocol.

The network node (e.g., the service layer entity) may perform ADU identification. For example, based at least in part on the application server failing to provide ADU metadata to the UPF (e.g., or otherwise to the network), the network node (e.g., the service layer entity and/or the UPF) may a technique to derive the ADU metadata from received traffic. In some aspects, the network node may perform deep packet inspection (DPI) for a well-known application protocol to derive the ADU metadata. For example, if a video frame is transmitted as several real-time transport protocol (RTP) packets, the packets would all bear a same timestamp in RTP headers. Packets with the same timestamp may be considered as associated with a same ADU. In some aspects, the network node may use an ML algorithm to derive the ADU metadata. For example, the network node or another device may train a neural-network-based model to identify application types of received traffic. For example, the neural network-based model may use inputs of timing, a periodicity, a number of packets, a pattern of packet sizes, or sizes of packets, among other examples. In some aspects, different algorithms may be applied to derive ADU metadata, based at least in part on an application type. For example, for streaming packets arriving in periodic bursts, a clustering algorithm may be applied to group packets as ADUs.

The network node may map traffic flows and/or ADUs to data radio bearers (DRBs). The traffic, as received from the application server, may include application data of one or more traffic flows. One or more traffic flows may be mapped onto a first QoS flow only. Additionally, or alternatively, one or more QoS flows may be mapped to a single DRB. In some aspects, a ADU aware flows and non-ADU aware flows may be mapped on the same DRB. As several Traffic Flows can be multiplexed over a DRB, ADUs on different flows may happen to have the same identification during transmission. When inter-ADU relationships on a same flow is used by a RAN network node in scheduling, this may cause ambiguity. For example, the RAN network node may detect late ADU arrival based on inter-ADU delay.

In some aspects, the network node may identify the traffic flow of each ADU and include a traffic flow identification in the ADU metadata before providing the application data to the RAN network node. In some aspects, the traffic flow may be identified based on the source and destination IP address and/or a port number of ADU packets. In some aspects, the traffic flow identification may be assigned by the network node (e.g., the UPF and/or the service layer entity).

Figure 5:
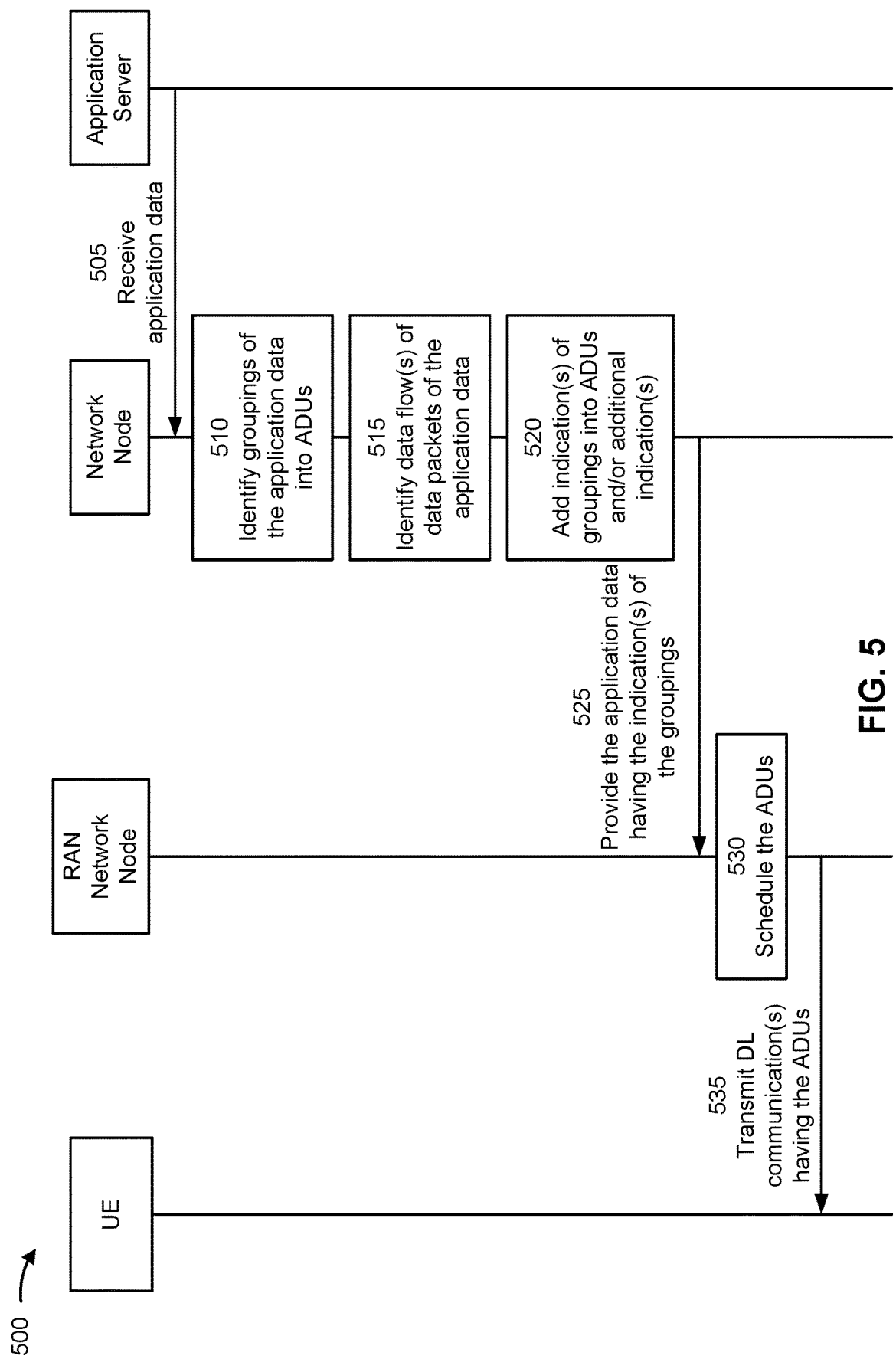
FIGS. 5 and 6 are diagrams illustrating examples associated with grouping application data into application data units, in accordance with the present disclosure.

FIG. 5 is a diagram of an example 500 associated with grouping application data into ADUs, in accordance with the present disclosure. As shown in FIG. 5, a network node (e.g., a UPF, a server, and/or a service layer entity) may communicate with an application server and a RAN network node (e.g., base station 110, a CU, a DU, and/or an RU). The RAN network node, the network node, and/or the application server may communicate with a UE (e.g., UE 120) via a communication link between the UE and the RAN network node. In some aspects, the RAN network node and the network node may be part of a same network domain. In some aspects, the RAN network node and the UE may be part of a wireless network (e.g., wireless network 100). The UE and the network node may have established a wireless connection prior to operations shown in FIG. 5.

As shown by reference number 505, the network node may receive application data from an application server. The application data may include data for joint processing at the UE, such as frames of a video stream and/or an extended reality application. In some aspects, the application data may be indicated for transmission via an additional network node, such as the RAN network node.

In some aspects, the network node may receive the application data having one or more additional indications associated with the ADUs and/or groupings into the ADUs. For example, the application data may indicate groupings of data packets into ADUs, one or more ADU lengths, a number of data packets of the application data per ADU, indications of data flows associated with the data packets of the application data, one or more FEC parameters associated with the ADUs, and/or one or more quality metrics associated with the ADUs, among other examples. In some aspects, a first set of the one or more indications may be included in each data packet, a second set of the one or more indications may be included in each ADU, and/or a third set of the one or more indications may be included to indicate a change from a previous ADU, among other examples.

As shown by reference number 510, the network node may identify groupings of the application data into ADUs. In some aspects, the network node may identify the groupings of the application data into ADUs based at least in part on the indication of the groupings as indicated by the application server (e.g., in an indication of the ADU groupings from an application server). In some aspects, the network node may identify the groupings independently from (e.g., in the absence of) an indication of the groupings from the application server. For example, the network node may identify the groupings based at least in part on deep packet inspection of the data packets of the application data, timing of the data packets of the application data, and/or an ML, among other examples.

The network node may identify groupings based at least in part on training and/or using the ML model using inputs and results from previous application data. For example, the ML model may be based at least in part on parameters including the timing of the data packets of the application data, a periodicity of the data packets, a number of data packets of the application data, sizes of the data packets, and/or patterns of characteristics of the data packets, among other examples.

In some aspects, the network node may identify metadata associated with the ADUs, including one or more additional indications associated with the ADUs. For example, the network node may identify the one or more additional indications that are associated with one or more ADU lengths, a number of data packets of the application data per ADU, indications of data flows associated with the data packets of the application data, one or more FEC parameters associated with the ADUs, and/or one or more quality metrics associated with the ADUs, among other examples. In some aspects, a first set of the one or more additional indications may be included in each data packet, a second set of the one or more additional indications may be included in each ADU, and/or a third set of the one or more additional indications may be included to indicate a change from a previous ADU, among other examples.

As shown by reference number 515 the network node may identify one or more data flows of the data packets of the application data. In some aspects, the network node may identify the one or more data flows based at least in part on an indication from the application server, source addresses of the data packets, destination addresses of the data packets, and/or port numbers of the data packets, among other examples. In some aspects, the network node may train and/or use an ML model to identify the one or more data flows based at least in part on source addresses of the data packets, destination addresses of the data packets, and/or port numbers of the data packets, among other examples.

As shown by reference number 520, the network node may add one or more indications of groupings into ADUs and/or one or more additional indications associated with the ADUs. For example, the network node may add the one or more indications of groupings into the ADUs and/or the one or more additional indications as identified in connection with reference number 510.

As shown by reference number 525, the network node may provide, to the RAN network node, the application data having the one or more indications of the groupings. In some aspects, the network node may also provide the one or more additional indications to the RAN network node. In some aspects, the one or more indication of the groupings and/or the one or more additional indications may be carried in a protocol header of the application data or piggybacked with the application data (e.g., appended to the application data). In some aspects, the network node may provide the application data indirectly to the RAN network node (e.g., via one or more additional nodes, such as core network nodes and/or relays or routers).

In some aspects, the network node may transmit the application data having one or more indications associated with the ADUs. For example, the application data may indicate groupings of data packets into ADUs, one or more ADU lengths, a number of data packets of the application data per ADU, indications of data flows associated with the data packets of the application data, one or more FEC parameters associated with the ADUs, and/or one or more quality metrics associated with the ADUs, among other examples. In some aspects, a first set of the one or more indications may be included in each data packet, a second set of the one or more indications may be included in each ADU, and/or a third set of the one or more indications may be included to indicate a change from a previous ADU, among other examples.

In some aspects, the one or more additional indications provided by the network node may be different from the one or more additional indications provided by the application server to the network node. For example, the one or more additional indications provided by the network node may be modified from the one or more additional network nodes received by the network node from the application server. In some aspects, the network node may provide the one or more additional indications independently from (e.g., in the absence of) receiving the one or more additional indications from the application server.

As shown by reference number 530, the RAN network node may schedule the ADUs for transmission to the UE. In some aspects, the RAN network node may schedule the ADUs based at least in part on the groupings of the application data into the ADUs and/or based at least in part on the one or more additional indications. For example, the RAN network node may schedule data packets for transmission to the UE with a priority that is based at least in part on the data packets being associated with an ADU and based at least in part on one or more KPIs for the ADU as indicated in the one or more additional indications.

As shown by reference number 535, the RAN network node may transmit, to the UE, one or more downlink communications having the one or more ADUs.

Based at least in part on the network node providing the application data with the indication of the groupings of the application data into ADUs, the network (e.g., a RAN network node) may handle communications associated with the application data based at least in part on the ADUs (e.g., using KPIs or other additional indications associated with the ADUs), which may conserve computing, power, network, and/or communication resources that may have otherwise been consumed based at least in part on an increased communication error rate from failing to satisfy the KPIs associated with the ADUs. Additionally, or alternatively, the network may conserve network resources that may have otherwise been consumed to conservatively attempt to satisfy the KPIs associated with the ADUs.

As indicated above, FIG. 5 is provided as an example. Other examples may differ from what is described with regard to FIG. 5.

Figure 6:
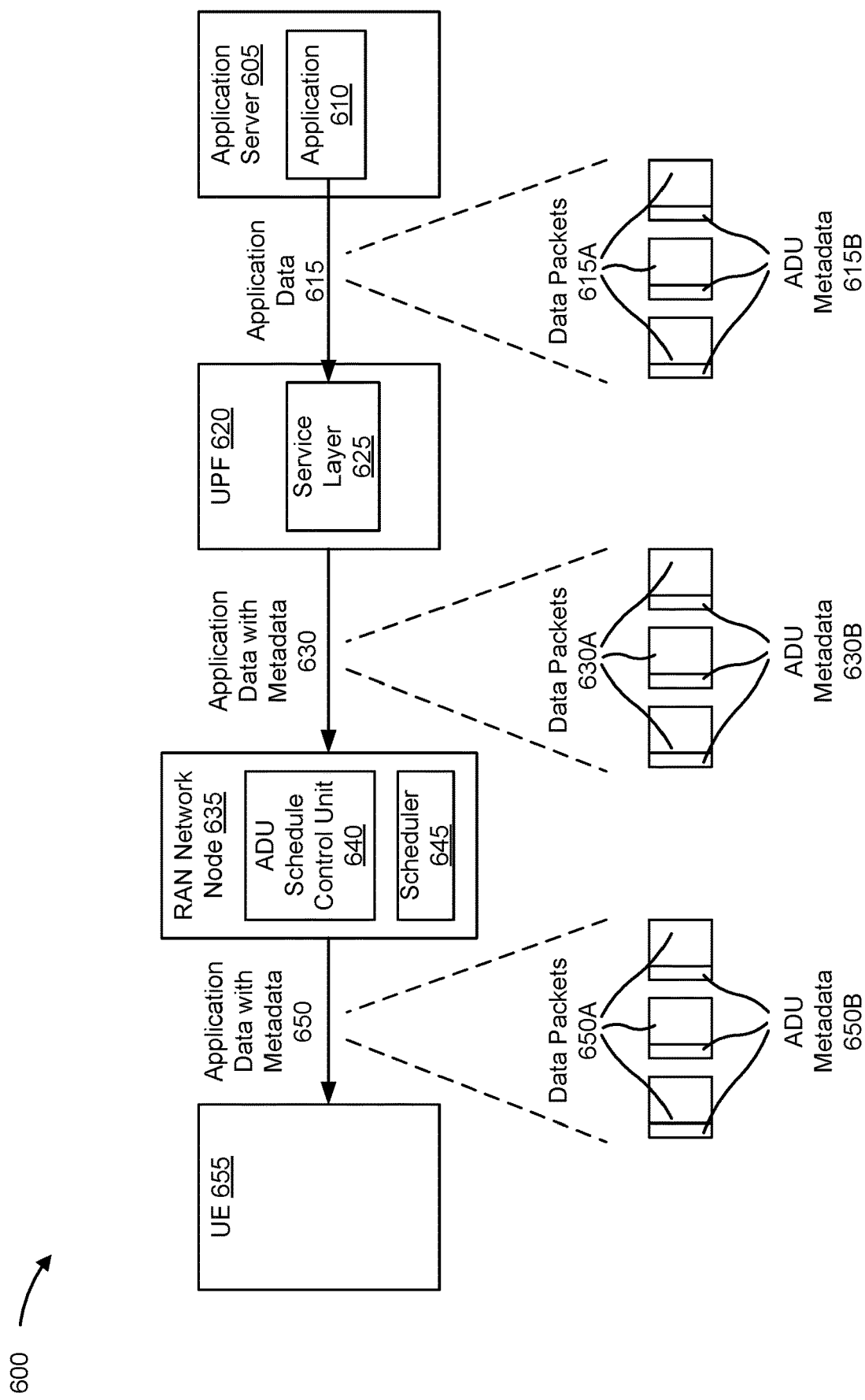

FIG. 6 is a diagram of an example 600 associated with grouping application data into ADUs, in accordance with the present disclosure. As shown in FIG. 6, an application server, a UPF, a RAN network node (e.g., base station 110, a CU, a DU, and/or an RU) and/or a UE (e.g., UE 120) may communicate application data. The RAN network node, the network node, and/or the application server may communicate with the UE via a communication link between the UE and the RAN network node. In some aspects, the RAN network node and the network node may be part of a same network domain. In some aspects, the RAN network node and the UE may be part of a wireless network (e.g., wireless network 100). The UE and the network node may have established a wireless connection prior to operations shown in FIG. 6.

As shown in FIG. 6, the application server 605 may include an application 610. For example, the application server 605 may host the application 610 on one or more components of the application server 605 (e.g., on hardware and/or a combination of hardware and software of the application server 605).

The application 610 may provide application data 615 to the UPF. The application data may include one or more data packets 615A and ADU metadata 615B. In some aspects, the ADU metadata 615B includes a first portion that is appended to or included in each data packet 615A. The ADU metadata 615B may include a second portion that is appended to or included in each ADU of the application data 615.

The UPF 620 may receive the application data 615 at a service layer entity 625 that is configured to manage ADU groupings. For example, the service layer entity 625 may be configured to identify the ADU groupings and/or one or more additional indications associated with the ADUs, as indicated herein.

The UPF 620 provides the application data with metadata 630 to the RAN network node 635. The application data with metadata 630 may include one or more data packets 630A and ADU metadata 630B. In some aspects, the ADU metadata 630B includes a first portion that is appended to or included in each data packet 630A. The ADU metadata 630B may include a second portion that is appended to or included in each ADU of the application data with metadata 630. The application data with metadata 630 may include additional, modified, or new metadata, when compared to the ADU metadata 615B.

The RAN network node 635 may receive the application data with metadata 630. The RAN network node 635 may use the application data with metadata 630 at an ADU schedule control unit that identifies data packets associated with different ADUs. An ADU schedule control unit may determine if an ADU is to be scheduled (e.g., if the ADU is not expired), a priority of the ADU for scheduling, and/or when to schedule the ADU based at least in part on the ADU metadata 630B.

A scheduler 645 may receive information from the ADU schedule control unit 640 associated with scheduling the application data for downlink communication with the UE 655. Based at least in part on the information from the ADU schedule control unit 640, the scheduler may indicate, to the UE 655, resources for one or more downlink communications that include the application data with metadata 650.

The RAN network node 635 may provide the application data with metadata 650 to the UE 655. The application data with metadata 650 may include one or more data packets 650A and ADU metadata 650B. In some aspects, the ADU metadata 650B includes a first portion that is appended to or included in each data packet 650A. The ADU metadata 650B may include a second portion that is appended to or included in each ADU of the application data with metadata 650. The application data with metadata 650 may include additional, modified, or new metadata, when compared to the ADU metadata 615B and/or the ADU metadata 630B.

As indicated above, FIG. 6 is provided as an example. Other examples may differ from what is described with regard to FIG. 6.

Figure 7:
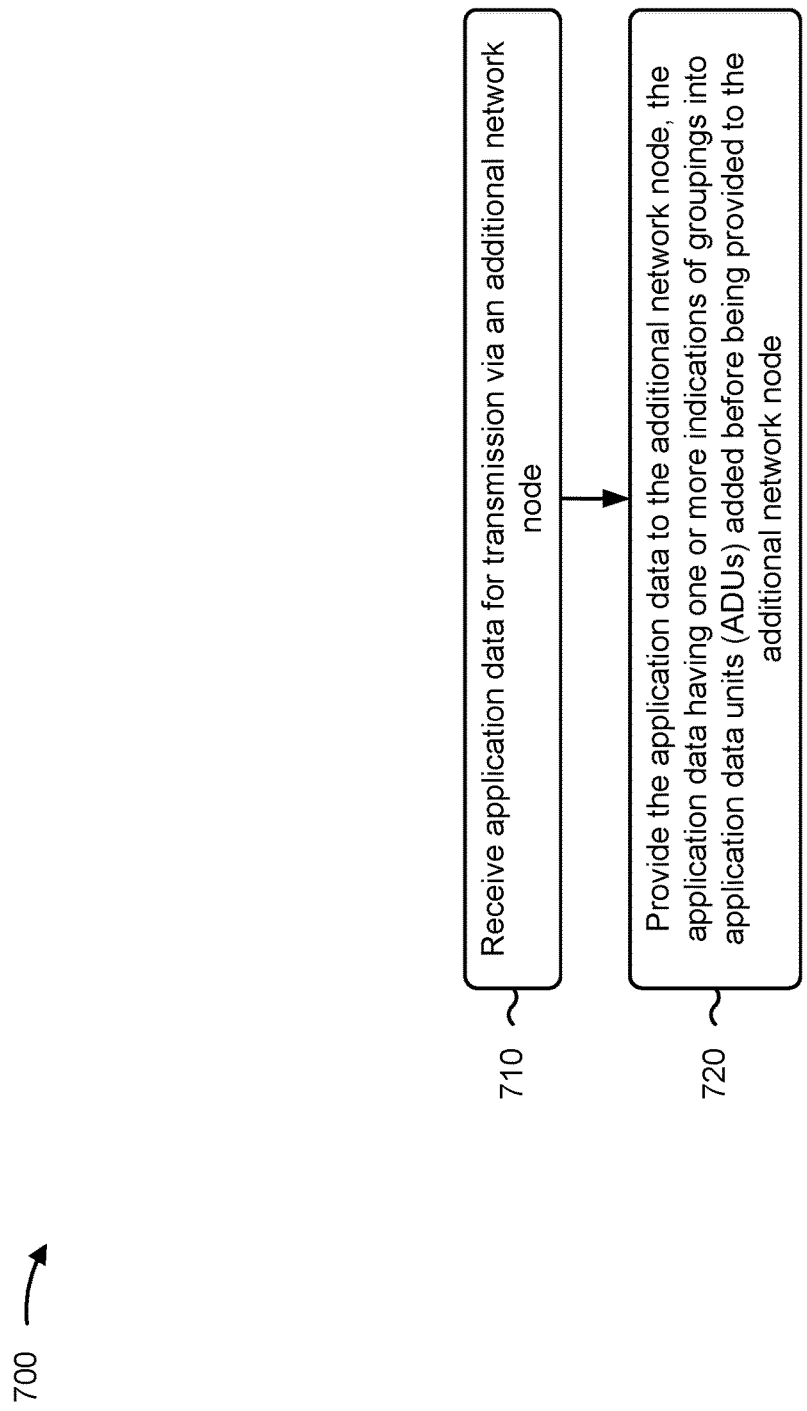
FIG. 7 is a diagram illustrating an example process associated with grouping application data into application data units, in accordance with the present disclosure.

FIG. 7 is a diagram illustrating an example process 700 performed, for example, by a network node, in accordance with the present disclosure. Example process 700 is an example where the network node (e.g., a UPF, a service layer entity, and/or one or more devices or components used by the UPF and/or the service layer entity) performs operations associated with ADUs.

As shown in FIG. 7, in some aspects, process 700 may include receiving application data for transmission via an additional network node (block 710). For example, the network node (e.g., using processor 820, memory 830, input component 840, and/or communication component 860, depicted in FIG. 8) may receive application data for transmission via an additional network node, as described above.

As further shown in FIG. 7, in some aspects, process 700 may include providing the application data to the additional network node, the application data having one or more indications of groupings into ADUs added before being provided to the additional network node (block 720). For example, the network node (e.g., using processor 820, memory 830, output component 850, and/or communication component 860, depicted in FIG. 8) may provide the application data to the additional network node, the application data having one or more indications of groupings into ADUs added before being provided to the additional network node, as described above.

Process 700 may include additional aspects, such as any single aspect or any combination of aspects described below and/or in connection with one or more other processes described elsewhere herein.

In a first aspect, process 700 includes adding one or more of the one or more indications of the groupings into ADUs, or one or more additional indications associated with ADUs.

In a second aspect, alone or in combination with the first aspect, the application data comprises one or more additional indications associated with ADUs comprising one or more of one or more ADU lengths, a number of data packets of the application data per ADU, indications of data flows associated with the data packets of the application data, one or more forward error correction parameters associated with the ADUs, or one or more quality metrics associated with the ADUs.

In a third aspect, alone or in combination with one or more of the first and second aspects, process 700 includes identifying the data flows associated with the data packets of the application data based at least in part on one or more of source addresses of the data packets, destination addresses of the data packets, or porting numbers of the data packets.

In a fourth aspect, alone or in combination with one or more of the first through third aspects, the one or more additional indications are carried in a protocol header of the application data or piggybacked with the application data.

In a fifth aspect, alone or in combination with one or more of the first through fourth aspects, process 700 includes identifying the groupings into ADUs based at least in part on one or more of an indication of the ADU groupings from an application server, deep packet inspection, timing of data packets of the application data, or a machine learning model.

In a sixth aspect, alone or in combination with one or more of the first through fifth aspects, the machine learning model is based at least in part on parameters comprising one or more of the timing of the data packets of the application data, a periodicity of the data packets, a number of data packets of the application data, sizes of the data packets, or patterns of characteristics of the data packets.

In a seventh aspect, alone or in combination with one or more of the first through sixth aspects, receiving the application data comprises receiving the application data having one or more additional indications of groupings into the ADUs.

In an eighth aspect, alone or in combination with one or more of the first through seventh aspects, providing the application data to the additional network node comprises one or more of adding one or more additional indications associated with the ADUs to the application data, or modifying the one or more additional indications of groupings to generate the one or more indications of groupings.

In a ninth aspect, alone or in combination with one or more of the first through eighth aspects, receiving the application data comprises receiving one or more additional indications associated with the ADUs.

In a tenth aspect, alone or in combination with one or more of the first through ninth aspects, receiving the one or more additional indications associated with the ADUs comprises receiving the one or more additional indications per ADU, or receiving the one or more additional indications based at least in part on a change of one or more values of the one or more additional indications.

In an eleventh aspect, alone or in combination with one or more of the first through tenth aspects, the network node comprises one or more of a service layer entity, or a user plane function.

In a twelfth aspect, alone or in combination with one or more of the first through eleventh aspects, the additional network node comprises a radio access network (RAN) network node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
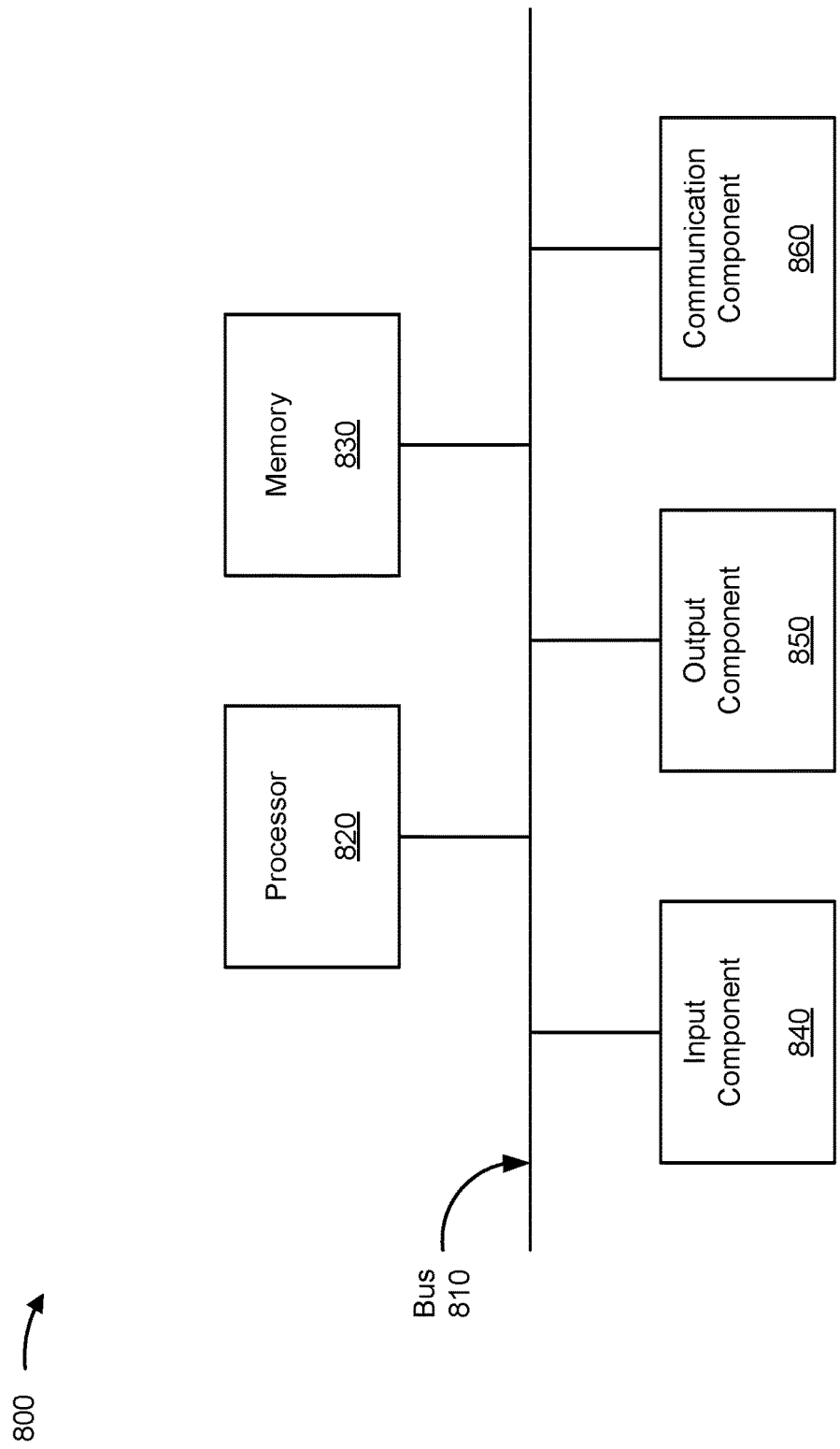
FIG. 8 is a diagram of an example apparatus for wireless communication, in accordance with the present disclosure.

FIG. 8 is a diagram of example components of a device 800, which may correspond to a UE, a RAN network node, a network node, and/or an application server (e.g., as described in connection with FIG. 5). In some implementations, the UE, the RAN network node, the network node, and/or the application server include one or more devices 800 and/or one or more components of device 800. As shown in FIG. 8, device 800 may include a bus 810, a processor 820, a memory 830, an input component 840, an output component 850, and a communication component 860.

Bus 810 includes one or more components that enable wired and/or wireless communication among the components of device 800. Bus 810 may couple together two or more components of FIG. 8, such as via operative coupling, communicative coupling, electronic coupling, and/or electric coupling. Processor 820 includes a central processing unit, a graphics processing unit, a microprocessor, a controller, a microcontroller, a digital signal processor, a field-programmable gate array, an application-specific integrated circuit, and/or another type of processing component. Processor 820 is implemented in hardware, firmware, or a combination of hardware and software. In some implementations, processor 820 includes one or more processors capable of being programmed to perform one or more operations or processes described elsewhere herein.

Memory 830 includes volatile and/or nonvolatile memory. For example, memory 830 may include random access memory (RAM), read only memory (ROM), a hard disk drive, and/or another type of memory (e.g., a flash memory, a magnetic memory, and/or an optical memory). Memory 830 may include internal memory (e.g., RAM, ROM, or a hard disk drive) and/or removable memory (e.g., removable via a universal serial bus connection). Memory 830 may be a non-transitory computer-readable medium. Memory 830 stores information, instructions, and/or software (e.g., one or more software applications) related to the operation of device 800. In some implementations, memory 830 includes one or more memories that are coupled to one or more processors (e.g., processor 820), such as via bus 810.

Input component 840 enables device 800 to receive input, such as user input and/or sensed input. For example, input component 840 may include a touch screen, a keyboard, a keypad, a mouse, a button, a microphone, a switch, a sensor, a global positioning system sensor, an accelerometer, a gyroscope, and/or an actuator. Output component 850 enables device 800 to provide output, such as via a display, a speaker, and/or a light-emitting diode. Communication component 860 enables device 800 to communicate with other devices via a wired connection and/or a wireless connection. For example, communication component 860 may include a receiver, a transmitter, a transceiver, a modem, a network interface card, and/or an antenna.

Device 800 may perform one or more operations or processes described herein. For example, a non-transitory computer-readable medium (e.g., memory 830) may store a set of instructions (e.g., one or more instructions or code) for execution by processor 820. Processor 820 may execute the set of instructions to perform one or more operations or processes described herein. In some implementations, execution of the set of instructions, by one or more processors 820, causes the one or more processors 820 and/or the device 800 to perform one or more operations or processes described herein. In some implementations, hardwired circuitry is used instead of or in combination with the instructions to perform one or more operations or processes described herein. Additionally, or alternatively, processor 820 may be configured to perform one or more operations or processes described herein. Thus, implementations described herein are not limited to any specific combination of hardware circuitry and software.

The number and arrangement of components shown in FIG. 8 are provided as an example. Device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

The following provides an overview of some Aspects of the present disclosure:

Aspect 1: A method of wireless communication performed by a network node, comprising: receiving application data for transmission via an additional network node; and providing the application data to the additional network node, the application data having one or more indications of groupings into application data units (ADUs) added before being provided to the additional network node.

Aspect 2: The method of Aspect 1, further comprising adding one or more of: the one or more indications of the groupings into ADUs, or one or more additional indications associated with ADUs.

Aspect 3: The method of any of Aspects 1 or 2, wherein the application data comprises one or more additional indications associated with ADUs comprising one or more of: one or more ADU lengths, a number of data packets of the application data per ADU, indications of data flows associated with the data packets of the application data, one or more forward error correction parameters associated with the ADUs, or one or more quality metrics associated with the ADUs.

Aspect 4: The method of Aspect 3, further comprising identifying the data flows associated with the data packets of the application data based at least in part on one or more of: source addresses of the data packets, destination addresses of the data packets, or port numbers of the data packets.

Aspect 5: The method of any of Aspects 3 or 4, wherein the one or more additional indications are carried in a protocol header of the application data or piggybacked with the application data.

Aspect 6: The method of any of Aspects 1-5, further comprising identifying the groupings into ADUs based at least in part on one or more of: an indication of the ADU groupings from an application server, deep packet inspection, timing of data packets of the application data, or a machine learning model.

Aspect 7: The method of Aspect 6, wherein the machine learning model is based at least in part on parameters comprising one or more of: the timing of the data packets of the application data, a periodicity of the data packets, a number of data packets of the application data, sizes of the data packets, or patterns of characteristics of the data packets.

Aspect 8: The method of any of Aspects 1-7, wherein receiving the application data comprises receiving the application data having one or more additional indications of groupings into the ADUs.

Aspect 9: The method of Aspect 8, wherein providing the application data to the additional network node comprises one or more of: adding one or more additional indications associated with the ADUs to the application data, or modifying the one or more additional indications of groupings to generate the one or more indications of groupings.

Aspect 10: The method of any of Aspects 8 or 9, wherein receiving the application data comprises: receiving one or more additional indications associated with the ADUs.

Aspect 11: The method of Aspect 10, wherein receiving the one or more additional indications associated with the ADUs comprises: receiving the one or more additional indications per ADU, or receiving the one or more additional indications based at least in part on a change of one or more values of the one or more additional indications.

Aspect 12: The method of any of Aspects 1-11, wherein the network node comprises one or more of: a service layer entity, or a user plane function.

Aspect 13: The method of any of Aspects 1-12, wherein the additional network node comprises a radio access network (RAN) network node.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network node, comprising:
   receiving, from an application server, application data for transmission to a user equipment (UE) via an additional network node,
      wherein receiving the application data comprises receiving metadata associated with the application data, and
      wherein the metadata comprises one or more additional indications piggybacked with a payload of the application data;
   identifying, based at least in part on the metadata, one or more groupings of the application data into application data units (ADUs);
   adding one or more indications of the one or more groupings into the ADUs; and
   providing the application data to the additional network node, the application data having the one or more indications of the groupings into the ADUs added, by the network node, before being provided to the additional network node,
      wherein the network node comprises one or more of:
         a service layer entity, or
         a user plane function.

2. The method of claim 1, further comprising adding the one or more additional indications associated with ADUs.

3. The method of claim 1, wherein the one or more additional indications indicate one or more of:
   one or more ADU lengths,
   a number of data packets of the application data per ADU,
   indications of data flows associated with the data packets of the application data,
   one or more forward error correction parameters associated with the ADUs, or
   one or more quality metrics associated with the ADUs.

4. The method of claim 3, further comprising identifying the data flows associated with the data packets of the application data based at least in part on one or more of:
   source addresses of the data packets, destination addresses of the data packets, or port numbers of the data packets.

5. The method of claim 3, wherein the one or more additional indications include at least one additional indication that is carried in a protocol header of the application data.

6. The method of claim 1, further comprising identifying the groupings into ADUs based at least in part on one or more of:

an indication of the ADU groupings from an application server, deep packet inspection, timing of data packets of the application data, or a machine learning model.

7. The method of claim 6, wherein the machine learning model is based at least in part on parameters comprising one or more of:

the timing of the data packets of the application data, a periodicity of the data packets, a number of data packets of the application data, sizes of the data packets, or patterns of characteristics of the data packets.

8. The method of claim 1, wherein receiving the application data comprises receiving the application data having one or more additional grouping indications of the groupings into the ADUs.

9. The method of claim 8, wherein providing the application data to the additional network node comprises one or more of:

adding at least one of the one or more additional indications to the application data, or modifying the one or more additional grouping indications to generate the one or more indications of the groupings.

10. The method of claim 8, wherein receiving the application data comprises:

receiving the one or more additional indications.

11. The method of claim 10, wherein receiving the one or more additional indications comprises:

receiving the one or more additional indications per ADU, or receiving the one or more additional indications based at least in part on a change of one or more values of the one or more additional indications.

12. The method of claim 1, wherein the additional network node comprises a radio access network (RAN) network node.

13. The method of claim 1, wherein the metadata comprises a traffic flow identification associated with the application data.

14. A network node for wireless communication, comprising:

one or more memories; and one or more processors, coupled to the one or more memories, configured to:

receive, from an application server, application data for transmission to a user equipment (UE) via an additional network node, wherein the application data is received with metadata associated with the application data, and wherein the metadata comprises one or more additional indications piggybacked with a payload of the application data;

identify, based at least in part on the metadata, one or more groupings of the application data into application data units (ADUs);

add one or more indications of the one or more groupings into the ADUs; and provide the application data to the additional network node, the application data having the one or more indications of the groupings into the ADUs added before being provided to the additional network node, wherein the network node comprises one or more of:

a service layer entity, or a user plane function.

15. The network node of claim 14, wherein the one or more processors are further configured to add the one or more additional indications associated with ADUs.

16. The network node of claim 14, wherein the one or more additional indications indicate one or more of:

one or more ADU lengths, a number of data packets of the application data per ADU, indications of data flows associated with the data packets of the application data, one or more forward error correction parameters associated with the ADUs, or one or more quality metrics associated with the ADUs.

17. The network node of claim 16, wherein the one or more processors are further configured to identify the data flows associated with the data packets of the application data based at least in part on one or more of:

source addresses of the data packets, destination addresses of the data packets, or port numbers of the data packets.

18. The network node of claim 16, wherein the one or more additional indications include at least one additional indication that is carried in a protocol header of the application data.

19. The network node of claim 14, wherein the one or more processors are further configured to identify the groupings into ADUs based at least in part on one or more of:

an indication of the ADU groupings from an application server, deep packet inspection, timing of data packets of the application data, or a machine learning model.

20. The network node of claim 19, wherein the machine learning model is based at least in part on parameters comprising one or more of:

the timing of the data packets of the application data, a periodicity of the data packets, a number of data packets of the application data, sizes of the data packets, or patterns of characteristics of the data packets.

21. The network node of claim 14, wherein the one or more processors, to receive the application data, are configured to receive the application data having one or more additional grouping indications of the groupings into the ADUs.

22. The network node of claim 21, wherein the one or more processors, to provide the application data to the additional network node, are configured to:

add at least one of the one or more additional indications to the application data, or modify the one or more additional grouping indications to generate the one or more indications of the groupings.

23. The network node of claim 21, wherein the one or more processors are configured to:

receive the one or more additional indications.

24. The network node of claim 23, wherein the one or more processors, to receive the one or more additional indications associated with the ADUs, are configured to:

receive the one or more additional indications per ADU, or receive the one or more additional indications based at least in part on a change of one or more values of the one or more additional indications.

25. The network node of claim 14, wherein the additional network node comprises a radio access network (RAN) network node.

26. The network node of claim 14, wherein the metadata comprises a traffic flow identification associated with the application data.

27. A non-transitory computer-readable medium storing a set of instructions for wireless communication, the set of instructions comprising:
one or more instructions that, when executed by one or more processors of a network node, cause the network node to:
receive, from an application server, application data for transmission to a user equipment (UE) via an additional network node,
wherein the application data is received with metadata associated with the application data, and
wherein the metadata comprises one or more additional indications piggybacked with a payload of the application data;
identify, based at least in part on the metadata, one or more groupings of the application data into application data units (ADUs);
add one or more indications of the one or more groupings into the ADUs; and
provide the application data to the additional network node, the application data having the one or more indications of the groupings into the ADUs added before being provided to the additional network node,
wherein the network node comprises one or more of:
a service layer entity, or
a user plane function.

28. The non-transitory computer-readable medium of claim 27, wherein the one or more additional indications indicate one or more of:
one or more ADU lengths,
a number of data packets of the application data per ADU,
indications of data flows associated with the data packets of the application data,
one or more forward error correction parameters associated with the ADUs, or
one or more quality metrics associated with the ADUs.

29. The non-transitory computer-readable medium of claim 28, wherein the one or more instructions further cause the network node to:
identify the data flows associated with the data packets of the application data based at least in part on one or more of:
source addresses of the data packets,
destination addresses of the data packets, or
port numbers of the data packets.

30. The non-transitory computer-readable medium of claim 27, wherein the metadata comprises a traffic flow identification associated with the application data.

* * * * *